Dec. 6, 1955    R. E. TRUFFAUT    2,725,593
METHOD OF RECOVERING THE HYPOPHYSIS FROM
THE SEVERED HEAD OF AN ANIMAL
Filed June 5, 1951    2 Sheets-Sheet 2

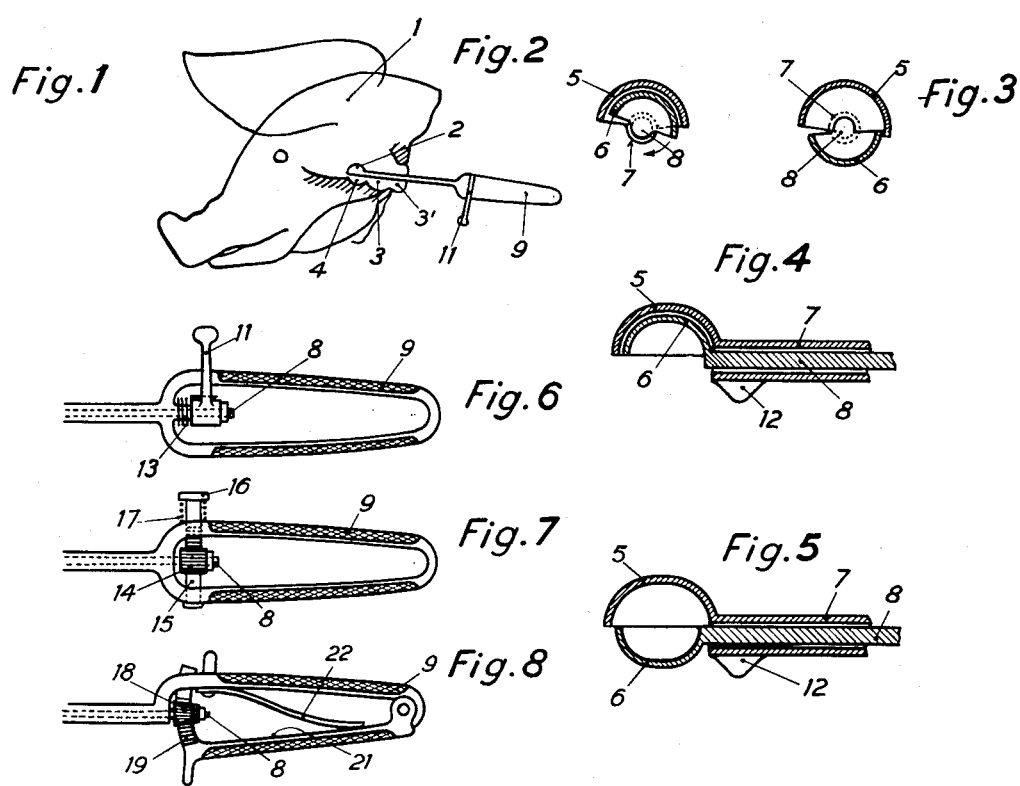

Inventor
Robert Ernest Truffaut
by
Attorney 2,725,593
Patented Dec. 6, 1955

2,725,593
METHOD OF RECOVERING THE HYPOPHYSIS FROM THE SEVERED HEAD OF AN ANIMAL

Robert Ernest Truffaut, Meulan, France

Application June 5, 1951, Serial No. 229,912

Claims priority, application France June 6, 1950

1 Claim. (Cl. 17—45)

The hypophyses or pituitary glands are of great importance to opotherapy. In order to extract these glands from severed heads of slaughtered animals such as pigs or calves it has hitherto been necessary to break up such heads, more particularly to longitudinally bisect the heads to expose said glands. Such work was very slow permitting the processing of not more than about twelve or thirteen heads per hour even by a skilled and experienced worker and was unsuitable for application in modern mass production in slaughter houses which process at least about 120 to 180 animals, such as pigs, per hour. The old method also resulted in damage or even destruction of valuable parts of the heads such as the brain.

The object of the present invention is to avoid the said disadvantages and to provide a method for the recovering of the hypophysis from the severed head of an animal which conserves the shape of the head, does not result in damage to or destruction of any portion thereof, and is adaptable to modern mass production.

According to my invention I recover the hypophysis from the severed head of an animal by grasping said hypophysis from the rear of said head through the transversely exposed rachidian canal, and the adjacent occipital lobe, severing the hypophysis from said head and withdrawing the severed hypophysis in rearward direction through the occipital lobe and the rachidian canal.

The invention will be more clearly understood by referring to the accompanying drawing in which—

Fig. 1 shows an elevational view, partly in section, of a pig head being subjected to my new method;

Figs. 2 to 5 illustrate a tool usable in my new method, Figs. 2 and 3 being transversal sectional views of the tool spoons or semi-shells in the open or the closed position, respectively, while Figs. 4 and 5 are longitudinal sectional views thereof;

Figure 12:
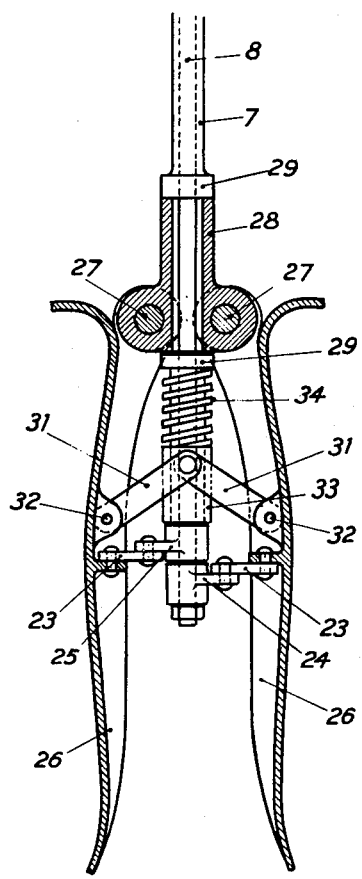
Figure 9:
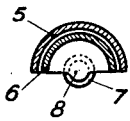
Figure 10:
Figure 11:
Figure 13:
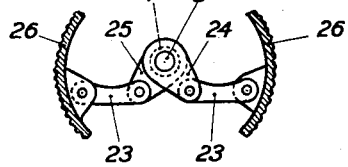

Figs. 6 to 8 are longitudinal views showing the tool handle and the means for controlling the tool spoons or semi-shells; and Figs. 9 to 13 illustrate another embodiment of a tool for use in my new method, Figs. 9, 10, 11 being transversal sectional views of the tool spoons or semi-shells in the open or the closed position, while Fig. 12 is a sectional elevational view of the tool handle and Fig. 13 a cross-sectional view thereof.

Fig. 1 shows, partly in section, the side view of a pig head and illustrates how the spoonlike head 2 of the tool is being introduced through the transversely exposed rachidian canal 3'.

The tool head 2 penetrates from there into the occipital lobe 3, situated at the lowermost portion of the brain, and reaches then the hypophysis housed in a small substantially hemispherical cavity 4 located closely deeper in the head.

The operator feels his tool abutting against the crest separating the cavities 3 and 4 from each other and therefore easily appraises, according to the magnitude of the head, the distance yet to be traveled by the tool, so that he may pick up the gland, as will be set forth later, and extract the same by retracting the tool out of the head.

In order to clearly understand the fineness of the operation and the form to be imparted to the tool, it has to be realized that the magnitude of the hypophysis, of a grown-up pig for example, is equal approximately to that of a single pea fruit, and that the consistence of the hypophysis is such that the latter cannot be seized by compression and must be detached from its natural bonds and adherences.

To this end, the extracting tool is composed of two spoonlike members or semi-shells 5 and 6, substantially hemispherical, concentric or eccentric, mounted on concentric shafts 7 and 8, respectively of which the external one 7, is tubular, stationary and rigid with the handle 9, while the internal one 8, is rotatable and controllable at will by the operator with the aid of a control member 11 attached to the handle 9 as shown in Figs. 6 to 8.

The operation consists substantially in introducing the tool with its spoonlike heads 5, 6 in overlapping position as shown in Fig. 2 into the head under treatment in such a way as to cap the gland with the stationary spoon 6, then acting upon the control member 11 in a manner to set the movable spoon 5 in opposition to the stationary spoon 6, so as to form an enclosure completely encompassing and grasping the hypophysis which, confined therein, may be reasonably withdrawn from the head without being damaged. The ejection of the gland from the tool is effected by bringing the movable spoon 5 back into the initial position thus making the tool ready for the next operation.

It is to be understood that the term "hemispherical" is to be read as including any other profiles of spoons or semi-shells best adaptable to the form of glands intended to be extracted.

The edges of the spoons may be chamfered with a view to facilitate the relative displacement thereof and to prevent the parts from abutting against each other.

A small abutment 12 (Figs. 4 and 5) may be arranged on the outer shaft 7 and adapted to apply against the crest separating the cavity 3 from the cavity 4.

A spring (not shown) may be provided on the handle to act directly or indirectly upon the inner spoon 6 in a manner to automatically bring the latter back to its open position, when the operator stops to act upon the control member.

In Figs. 2 and 4 the two spoons or semi-shells 5—6 of the total are shown in open relationship ready for the grasping operation, and in Figs. 3 and 4 they are shown in closed relationship forming an enclosure to receive the hypophysis in the course of said operation.

In Figs. 6, 7, 8 these different embodiments of the tool handle with its actuating means for rotating the inner spoon 6 are shown.

In Fig. 6 such rotation is controlled by a small lever 11 keyed on the shaft 8 and held in place by means of a coiled spring 13.

In Fig. 7 the rotation is controlled by means of a pinion 14 rigid with the shaft 8 and driven by a rack 15 controlled by a push-button 16 held in place by a helical compression spring 17.

In Fig. 8 the rotation is controlled by means of a level pinion 18 rigid with the shaft 8 and driven by a curved rack 19 carried by a lever 21 pivoted to the handle 9; the handle maintains the spoons 5, 6 in the open position with the aid of a flat compression-and-tension spring 22.

The handles are provided with deep serrations to prevent them from slipping off from the wet and greasy hands of the operator.

It is to be understood that changes may be effected in the particular ways, described and shown, of obtaining the rotation of the inner spoon, without substantially departing from the spirit and scope of the invention.

In the forms of tool illustrated in Figs. 9 to 13, each of the spoons or semi-shells 5—6 is rotatable with respect to the tool handle firmly held by the operator to attack the gland simultaneously on both sides.

Each semi-shell is then rotated through a quarter of revolution by means of a connecting rod 25 pivotally connecting a lever 24 or 25, mounted on the corresponding end of its shaft 7 or 8, respectively, with one of the movable parts 26 of the handle being pivoted, after the manner of pincers, at 27 to a sleeve 28 held in place on the external shaft 7, by means of abutments 29 (Figs. 12 and 13).

The conjugation of the displacement of the two movable parts 26 of the handle is obtained by means of a set of connecting rods 31 pivoted, on one hand, at 32 to each part of the handle and, on the other hand, to a sleeve 33 slidable along the external shaft 7. A helicoïdal compression spring 34 acting upon the sleeve 33 tends to maintain the apparatus in the open position.

The handle controlling mechanism is housed between the said parts 26 of the handle (see more particularly the cross-sectional view thereof shown in Fig. 13).

The same result may also be obtained by replacing the connecting rods 23 and levers 24, 25 by lugs rigid with the shafts 7, 8 and controllable by wedgelike surfaces arranged in the sleeve 33.

In order to facilitate the extraction of the hypophysis, the head under treatment should preferably be held fixed on a level best suited for the operator's hands and substantially in the position shown in Fig. 1, so that the extracting tool may be used substantially in horizontal position.

I claim as my invention:

The method of recovering the hypophysis from the severed head of an animal which method comprises grasping said hypophysis from the rear of said severed head through the rachidian canal and the adjacent occipital lobe of the head, severing said hypophysis from said head and withdrawing the same through said rachidian canal.

References Cited in the file of this patent

UNITED STATES PATENTS

| | | |
|---|---|---|
| 737,293 | Summerfeldt | Aug. 25, 1903 |
| 1,493,240 | Bohn | May 6, 1924 |
| 1,585,934 | Muir | May 25, 1926 |
| 1,663,761 | Johnson | Mar. 27, 1928 |
| 1,842,015 | Finson | Jan. 19, 1932 |

FOREIGN PATENTS

| | | |
|---|---|---|
| 691 | Italy | July 30, 1881 |

OTHER REFERENCES

Textbook of Endocrinology, Hans Seyle, published by Acta Endocrinologica, University de Montreal, Montreal, Canada, 1947, pages 231 to 234.